D. McC. CALVIN.
Bee-Hives.
No. 137,530.    Patented April 8, 1873.
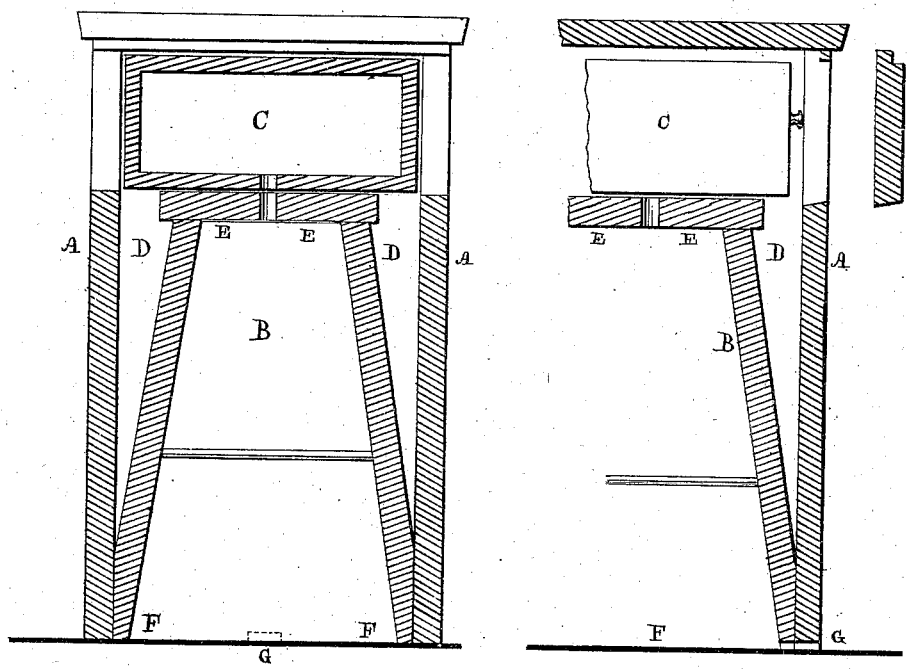
Witnesses.
A B Richmond
Roe Reisinger
Inventor.
David McC. Calvin

UNITED STATES PATENT OFFICE.

DAVID McCONAHEY CALVIN, OF EAST FALLOWFIELD, PA.

IMPROVEMENT IN BEE-HIVES.

Specification forming part of Letters Patent No. 137,530, dated April 8, 1873; application filed February 17, 1873.

*To all whom it may concern:*

Be it known that I, DAVID MCCONAHEY CALVIN, of East Fallowfield, in the county of Crawford and State of Pennsylvania, have invented a new and Improved Bee-Hive; and I do hereby declare that the following is a full and exact description of the same, reference being had to the accompanying drawing and the letters of reference marked thereon:

The object and nature of my invention are as follows, to wit: It is a fact well known to bee-keepers that in the fall of the year the bees in the hive collect in a cluster at the bottom of the hive, and that in eating the honey from the comb they always eat that portion immediately above them, and that they never consume the honey to the right or left. They will continue to do this until they reach the top of the hive, and then will never work down or sidewise, but will starve with plenty of honey on each side of them. The object then, is to so construct a hive that the bees will consume all the honey as they go up. To do this it is necessary to so construct the hive that they will build their combs as long as possible from the top to the bottom. It is also a well-known fact that when the swarm is young they are comparatively few in number, increasing very rapidly, and that also in the fall, when they cease working, they decrease in numbers in about the same ratio, the older bees dying first. This fact is to be taken into consideration, and the hive so constructed that the young swarm shall not have too much room laterally, to commence too many combs, but that they shall, for want of lateral room, be compelled to build downward, and as the swarm increases in number, that their space to work in shall also increase in size. This object is accomplished by my invention as follows, to wit:

The drawing represents a side view of my bee-hive, with the side removed to show the internal structure of the same.

A A is an outside case, of the form of the common box-hive. B is the hive proper, and is shaped like the base of a pyramid, the top at E E being much smaller than the bottom F F. C is a honey-drawer, which may be removed when filled; G, the entrance to the hive. D D is a space between the case A A and the hive proper B, which in winter may be filled straw, chaff, or sawdust, to keep the bees warm, which, when removed in the summer, will leave a space of air between the case A A and hive B, and thereby keep it cool.

Now, when the swarm is young and few in number, and are "hived" in B, (the opening into C being closed) they will commence to work and attach their combs at E E, and as the space at E E is small, they will be compelled to work downward, and as their numbers increase the lateral space in the hive B increases, affording them abundant room to work therein. By this construction, they will be compelled to construct long combs downward. Now, when the working season closes, the bees will all collect in a cluster at the bottom of the combs, and consume the honey upward. Now their numbers are large, but they gradually die off, and as their numbers gradually diminish the size of the hive (and consequently the comb) diminishes in proportion, thus causing them to consume the honey clean as they go up, until they get to the top E E.

What I claim as my invention, and desire to secure by Letters Patent, is as follows, to wit:

I claim the hive proper B, forming a frustum of a pyramid, in combination with the rectangular external case A, when the same are constructed as described, for the purposes set forth.

DAVID M. CALVIN.

Witnesses:
   A. B. RICHMOND,
   ROE REISINGER.